United States Patent
Guo et al.

(10) Patent No.: US 9,918,223 B2
(45) Date of Patent: Mar. 13, 2018

(54) FINGERPRINT BASED COMMUNICATION TERMINAL AND METHOD, SERVER AND METHOD THEREOF

(71) Applicant: JRD COMMUNCATION INC., Shenzhen (CN)

(72) Inventors: Aiping Guo, Shenzhen (CN); Xuelong Hu, Shenzhen (CN); Shiqing Zhao, Shenzhen (CN)

(73) Assignee: JRD Communication Inc., Shenzhen (CN)

( * ) Notice: Subject to any disclaimer, the term of this patent is extended or adjusted under 35 U.S.C. 154(b) by 41 days.

(21) Appl. No.: 14/914,395

(22) PCT Filed: Apr. 10, 2015

(86) PCT No.: PCT/CN2015/076276
§ 371 (c)(1),
(2) Date: Feb. 25, 2016

(87) PCT Pub. No.: WO2016/101440
PCT Pub. Date: Jun. 30, 2016

(65) Prior Publication Data
US 2016/0360401 A1    Dec. 8, 2016

(30) Foreign Application Priority Data

Dec. 26, 2014  (CN) .......................... 2014 1 0836371

(51) Int. Cl.
*H04W 12/02*  (2009.01)
*H04L 29/06*  (2006.01)
(Continued)

(52) U.S. Cl.
CPC ...... *H04W 12/02* (2013.01); *G06F 17/30867* (2013.01); *G06K 9/00006* (2013.01);
(Continued)

(58) Field of Classification Search
CPC ...... H04W 12/02; H04L 63/0861; H04M 1/66
See application file for complete search history.

(56) References Cited

U.S. PATENT DOCUMENTS

2005/0085217 A1*  4/2005  Lim ........................ H04M 1/66
                                                            455/410
2009/0042541 A1*  2/2009  Yi ....................... H04L 63/0861
                                                            455/411
(Continued)

FOREIGN PATENT DOCUMENTS

CN      101365241      2/2009
CN      101616416 A   12/2009
(Continued)

*Primary Examiner* — Myron K Wyche
(74) *Attorney, Agent, or Firm* — ShimokajiIP (57) ABSTRACT

A fingerprint based communication terminal and method, a server and method thereof are disclosed. The terminal includes a fingerprint processing module, a processing module, a storage module, and a communication module. The fingerprint processing module is configured to obtain fingerprint information; the processing module is configured to verify the fingerprint information through a network to obtain a fingerprint phone number bound to the fingerprint information, and bind the fingerprint phone number to the terminal; the storage module is configured to store the fingerprint phone number obtained by the processing module; and the communication module is configured to read the fingerprint phone number in the storage module for performing communication.

8 Claims, 4 Drawing Sheets

(51) Int. Cl.
    *H04W 12/06*    (2009.01)
    *G06F 17/30*    (2006.01)
    *G06K 9/00*     (2006.01)
    *H04M 1/2745*   (2006.01)
    *H04W 8/18*     (2009.01)

(52) U.S. Cl.
    CPC .. *H04L 63/0861* (2013.01); *H04M 1/274508* (2013.01); *H04W 8/18* (2013.01); *H04W 12/06* (2013.01); *H04M 2250/22* (2013.01)

(56) References Cited

U.S. PATENT DOCUMENTS

2010/0135542 A1* 6/2010 Keepper, Jr. .......... G06K 9/036
                                                  382/124
2013/0244614 A1* 9/2013 Santamaria ............ H04L 51/04
                                                  455/411

FOREIGN PATENT DOCUMENTS

CN      104156651 A    11/2014
WO      2013124635 A1   8/2013

* cited by examiner

FINGERPRINT BASED COMMUNICATION TERMINAL AND METHOD, SERVER AND METHOD THEREOF

TECHNICAL FIELD

The present disclosure relates to the field of mobile communication technologies, and in particular, to a fingerprint based communication terminal and a method thereof, a server and a method thereof.

BACKGROUND

Along with the development of wireless intelligent terminals and ever growing of the living standard of people, mobile phones have become important communication tools in people's daily life. When a conventional mobile phone is used, a subscriber identification card needs to be inserted in the mobile phone, and the subscriber identification card may be generally a plastic card having an IC chip mounted therein, which may be a SIM card and a UIM card.

The physical medium identification card used by the conventional intelligent terminals may be easily copied and embezzled. After a mobile phone is lost, a user generally cannot deregister the mobile phone in time, and before the user deregisters the mobile phone, a lawbreaker may steal the fees, or even cheat relatives and friends of the user by using information in the subscriber identification card. In this way, great security risks are brought to the user.

SUMMARY

The present disclosure provides a fingerprint based communication terminal and a method thereof, a server and a method thereof, which can communicate by using a fingerprint phone number, so that a personal phone number is safer.

An embodiment of a fingerprint based communication terminal is provided, and the terminal may include: a fingerprint processing module, a processing module, a storage module, and a communication module. The fingerprint processing module may be configured to obtain fingerprint information, where the fingerprint processing module may include a fingerprint sensor, a fingerprint processor, the fingerprint sensor may be configured to collect a user fingerprint, the fingerprint processor may be configured to process the user fingerprint collected by the fingerprint sensor to obtain fingerprint information and transmit the fingerprint information to the processing module; the processing module may be configured to obtain, through a network according to the fingerprint information, a phone number of person bound to a fingerprint phone number; the storage module may be configured to store the fingerprint phone number obtained by the processing module; and the communication module may be configured to read one or more fingerprint phone numbers stored in the storage module, and communicate by using the fingerprint phone number.

Another embodiment of a fingerprint based communication terminal is provided in the present disclosure, and the terminal may include: a fingerprint processing module, a processing module, a storage module, and a communication module, where the fingerprint processing module may be configured to obtain fingerprint information;
the processing module may be configured to perform verification through a network according to the fingerprint information to obtain a fingerprint phone number bound to the fingerprint information, and bind the fingerprint phone number to the terminal;
the storage module may be configured to store the fingerprint phone number obtained by the processing module; and
the communication module may be configured to read the fingerprint phone number in the storage module to conduct communication.

The fingerprint processing module may include a fingerprint sensor and a fingerprint processor, where the fingerprint sensor may be configured to collect a user fingerprint, and the fingerprint processor may be configured to process the user fingerprint collected by the fingerprint sensor to obtain fingerprint information, and transmit the fingerprint information to the processing module.

The processing module may be further configured to obtain, through the network, a phone number of another person bound to the fingerprint phone number; and the communication module may be configured to read one or more fingerprint phone numbers stored in the storage module, and communicate by using the fingerprint phone number.

Another embodiment of a fingerprint based communication method is provided in the present disclosure, and the method may include:
obtaining user fingerprint information; performing verification through a network according to the fingerprint information to obtain a fingerprint phone number bound to the fingerprint information, and binding the fingerprint phone number to a mobile terminal; storing the fingerprint phone number; and reading the fingerprint phone number to conduct communication.

The step of obtaining the user fingerprint information may include: collecting a user fingerprint; and processing the fingerprint to obtain the fingerprint information.

The step of obtaining the fingerprint phone number bound to the fingerprint information may include: obtaining, through the network, a phone number of another person bound to the fingerprint phone number; and the step of reading the fingerprint phone number to conduct communication includes reading one or more fingerprint phone numbers to conduct communication.

Another embodiment of a fingerprint based communication server is provided in the present disclosure, and the server may include: a fingerprint collector module, a first binding module, a verification module, and a second binding module, where
the fingerprint collector may be configured to collect user fingerprint information when a user subscribes for a new card, and transmit the fingerprint information to the first binding module;
the first binding module may be configured to bind the fingerprint information collected by the fingerprint collector to a fingerprint phone number;
the verification module may be configured to receive, through a network, verification fingerprint information sent by a mobile terminal, compare the verification fingerprint information with the fingerprint information in the first binding module, so as to perform verification; and
the second binding module may be configured to: when a verification result of the verification module is that the verification fingerprint information matches with the fingerprint information in the first binding module, bind the mobile terminal to the fingerprint phone number, and send the fingerprint phone number to the mobile terminal through the network.

The first binding module may be configured to bind a phone number of another person related to the fingerprint phone number.

The second binding module may be configured to cancel the previous binding to the same fingerprint phone number when the fingerprint phone number may be bound to the mobile terminal.

Another embodiment of a fingerprint based communication method is provided in the present disclosure, and the method may include:

collecting user fingerprint information; binding a fingerprint phone number to the fingerprint information; receiving verification fingerprint information sent by a mobile terminal, and verifying the verification fingerprint information; if a verification result of the fingerprint information is that the verification fingerprint information sent by the mobile terminal matches with the fingerprint information bound to the fingerprint phone number, binding the fingerprint phone number to the mobile terminal, and sending the fingerprint phone number through the network.

The step of binding the fingerprint phone number to the fingerprint information may include binding a phone number of another person related to the fingerprint phone number.

The step of binding the fingerprint phone number to the mobile terminal may include canceling the previous binding to the same fingerprint phone number when the fingerprint phone number may be bound to the mobile terminal.

The embodiments provided in the present disclosure has the following beneficial effects: different from the condition in the prior art, the embodiment collects user fingerprint information, obtains, through a network, a fingerprint phone number bound to the fingerprint information, and conducts communication by using the fingerprint phone number. Information in a subscriber identification card may be directly stored in a terminal, so as to substitute a physical medium in a conventional terminal, for example, a SIM card and a UIM card. For disclosed embodiments, it may be unnecessary to insert a subscriber identification card in a mobile terminal, and communication may be conducted by using a fingerprint phone number bound to the fingerprint and obtained through the network. When a user losses the mobile terminal, the user may conduct communication by directly using another mobile terminal, without the need of complicated processes such as reporting the loss and post-registration by queuing in a business hall, so that the personal phone number may be safer, and meanwhile, the loss caused by that the lost mobile phone may be avoided. Moreover, the embodiments can store multiple fingerprint phone numbers, thereby implementing multiple phone numbers for the same mobile phone, and omitting multiple identification card slot positions reserved in the terminal for the conventional terminal using physical medium subscriber identification cards.

DETAILED DESCRIPTION

The present disclosure may be described in detail through the accompanying drawings and implementation manners.

Figure 1:
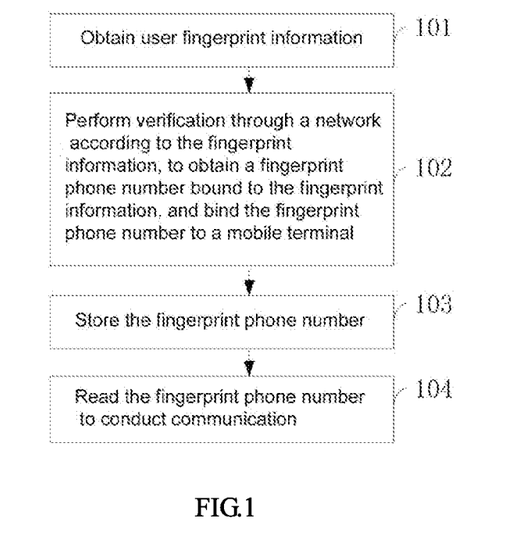
FIG. 1 depicts a schematic flow chart of an embodiment of a fingerprint based communication method according to the present disclosure.

Referring to FIG. 1, FIG. 1 depicts a schematic flow chart of an embodiment of a fingerprint based communication method according to the present disclosure, and the method may include:

S101: User fingerprint information may be obtained.

When a user uses a mobile phone for the first time or uses a mobile phone after starting up, a user fingerprint may be collected by using a fingerprint collecting module in the mobile terminal, and may be processed into fingerprint information. In an embodiment, primary pre-determination may be further performed on the processed fingerprint information, for example, determining whether the collected information may be the fingerprint information, and the completeness degree of the fingerprint information; if it is determined that it is not the fingerprint information or the fingerprint information is not complete, another attempt to collect the fingerprint information may be requested.

S102: Verification may be performed through a network according to the fingerprint information, to obtain a fingerprint phone number bound to the fingerprint information.

According to the user fingerprint information obtained in the step S101, the mobile terminal performs information interaction with an operator through the network, the mobile terminal sends the user fingerprint information to the operator through the network, the operator receives the user fingerprint information sent by the mobile terminal, performs comparison verification on the user fingerprint information and user fingerprint information pre-stored in an operator system, if the received user fingerprint information matches with the pre-stored user fingerprint information, the operator system sends, through the network, a fingerprint phone number bound to the fingerprint information to the mobile terminal of the user; otherwise, sends a verification failure message, for example, "Please enter your fingerprint again" and "Fingerprint information does not exist". In an embodiment, the previous binding of the fingerprint phone number to the terminal may be removed before, at the time of, or after obtaining the fingerprint phone number.

S103: The fingerprint phone number may be stored.

The mobile terminal receives the fingerprint phone number information sent by the operator system in step S102, and stores the information in a storage module of the mobile terminal. When the user intends to use the number for an activity such as communication or accessing the Internet, the process proceeds to step S104.

S104: The fingerprint phone number may be read to conduct communication.

The mobile terminal reads the phone number information stored in the step S103, sets the information as a local phone number of a simulated subscriber identification card of the terminal, for example, a local phone number of a simulated SIM card, and then uses the local phone number to implement functions such as communication and accessing the Internet. In an embodiment, it may be set in the mobile terminal that fingerprint information of another finger of the user may be bound to a phone number of another person, thereby implementing quick dialing.

In an embodiment, the mobile phone may be started up or shut down by using or not using the fingerprint information, and important software, information and the like in the mobile terminal may be locked by using the fingerprint, thereby avoiding the defects of a conventional terminal protecting information in the terminal by entering a password, such as that the password may be easily peeked or remembered by others and that the password may be easily broken. Meanwhile, in an embodiment, the terminal may support actively removing of obtained fingerprint phone numbers in the mobile phone, for example, when the mobile phone of the user runs out, and the user borrows a mobile phone of another person to conduct communication, the user may remove the phone call after completing the communication. In the embodiment makes a public terminal, and automatically clears the fingerprint phone number obtained previously after the call ends. In this way, when the mobile phone of the user runs out or the user does not carry the mobile phone when the user goes out, the user does not need to be bothered for not having a coin to insert, and the phone number of the user may be obtained directly using the fingerprint with the public terminal to conduct communication.

Different from the condition in the prior art, the present embodiment collects user fingerprint information, obtains, through a network, a fingerprint phone number bound to the fingerprint information, and conducts communication by using the fingerprint phone number. Information in a subscriber identification card may be directly stored in a terminal, so as to substitute a physical medium in a conventional terminal, for example, a SIM card and a UIM card. Hence it may be unnecessary to insert the subscriber identification card in a mobile terminal, and communication may be conducted by using a fingerprint phone number bound to the fingerprint and obtained through the network. When a user losses the mobile terminal, the user may conduct communication by directly using another mobile terminal, without the need of complicated processes such as reporting the loss and post-registration by queuing in a business hall, so that the personal phone number may be safer, and meanwhile, the loss caused by that the lost mobile phone may be avoided. Moreover, the embodiment can store multiple fingerprint phone numbers, thereby implementing multiple phone numbers for the same mobile phone, and omitting the multiple identification card slot positions reserved in the terminal for the conventional terminal using physical medium subscriber identification cards.

Figure 2:
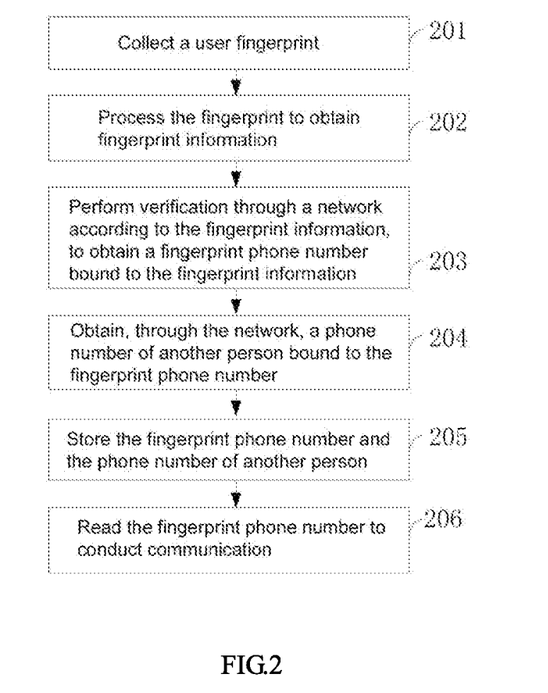
FIG. 2 depicts a schematic flow chart of another embodiment of a fingerprint based communication method according to the present disclosure.

Referring to FIG. 2, FIG. 2 depicts a schematic flow chart of another embodiment of a fingerprint based communication method, and the method may include:

S201: A user fingerprint may be collected.

When the user uses a terminal for the first time, the terminal collects information generated by a finger of the user touching a fingerprint collecting sensor on the terminal. Then, the process proceeds to step S201.

S202: The fingerprint may be processed so as to obtain the fingerprint information.

The terminal processes the user fingerprint collected in the step S201, for example, removing other parts except for fingerprint information, and converts the fingerprint into fingerprint information recognizable by the terminal.

S203: Verification is performed through a network according to the fingerprint information, to obtain a fingerprint phone number bound to the fingerprint information.

According to the user fingerprint information obtained in the step S202, the mobile terminal performs information interaction with an operator through the network, the mobile terminal sends the user fingerprint information to the operator through the network, the operator receives the user fingerprint information sent by the mobile terminal, performs comparison verification on the user fingerprint information and user fingerprint information pre-stored in an operator system, if the received user fingerprint information matches with the pre-stored user fingerprint information, the operator system sends, through the network, a fingerprint phone number bound to the fingerprint information to the mobile terminal of the user; otherwise, sends a verification failure message, for example, "Please enter your fingerprint again" and "Fingerprint information does not exist". Then, the process proceeds to step S204.

S204: A phone number of another person bound to the fingerprint phone number may be obtained through the network according to the fingerprint information.

During use, the user may transmit a phone number of another person important for the user by using or not using the network, bind the phone number to the fingerprint phone number of the user, and obtain, through the network, the phone number of the other person bound to the fingerprint phone number at the time of or not at the time of acquiring the fingerprint phone number of the user. In an embodiment, the phone number of another person may be bound to fingerprint information of another finger of the user, and by obtaining the fingerprint information of the other finger of the user, the mobile terminal obtains the phone number of another person bound to the fingerprint information of the finger. Then, the process proceeds to step S205.

S205: The fingerprint phone number and the phone number of another person may be stored.

The terminal automatically store the fingerprint phone number obtained in the step S203 and the phone number of another person obtained in the step S204. When the user needs to use the function of the fingerprint phone number, the process proceeds to step S206.

S206: The fingerprint phone number may be read to conduct communication.

The mobile terminal reads the fingerprint phone number information stored in the step S204, sets the information as a local phone number of a simulated subscriber identification card of the terminal, for example, a local phone number of a simulated SIM card, and then uses the fingerprint phone number to implement functions such as accessing the Internet or dialing the phone number of another person stored in the step S205 to conduct communication.

In the embodiment, by collecting the user fingerprint information, obtaining, through the network, the phone number bound to the fingerprint information, and meanwhile obtaining the phone number of another person bound to the phone number, short message information bound to the phone number can be obtained, and the obtained information may be directly stored in the mobile terminal, thereby implementing a random combination of a mobile phone and a phone number. Moreover, it may be more convenient for the user to separate the phone number and the mobile terminal, and the user can implement transferring of information such as phone numbers by only performing fingerprint collection on another terminal, which may be more convenient than the conventional terminal requiring inserting and unplugging a card.

Figure 3:
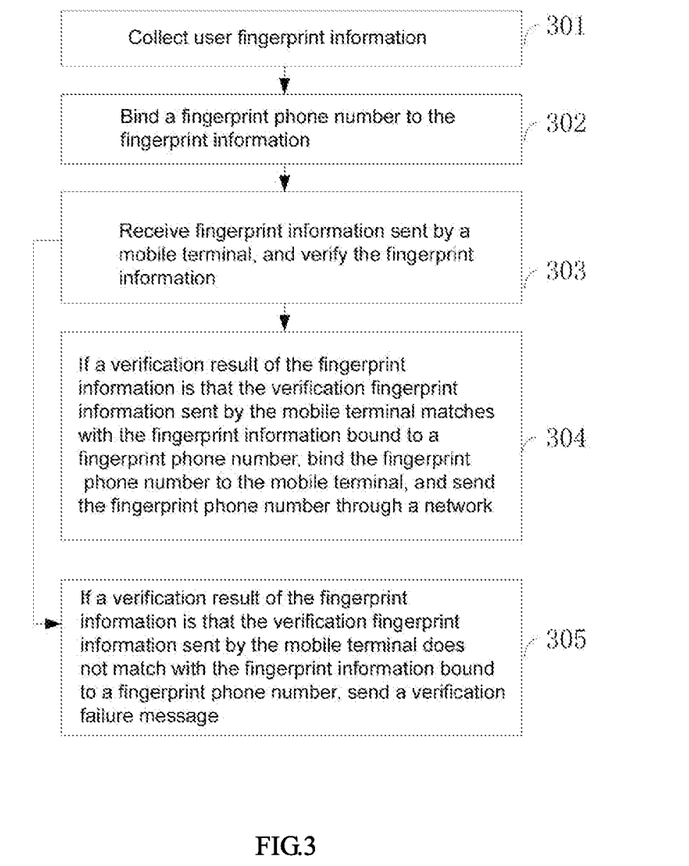
FIG. 3 depicts a schematic flow chart of another embodiment of a fingerprint based communication method according to the present disclosure.

Referring to FIG. 3, FIG. 3 depicts a schematic flow chart of a third implementation manner of a fingerprint based communication method according to the present invention, and the method includes:

S301: User fingerprint information may be collected.

When the user subscribes for a new card in a business hall of an operator, the operator collects user fingerprint information by using a fingerprint sensor or another tool. Then, the process proceeds to step S302.

S302: A fingerprint phone number may be bound to the fingerprint information.

The operator collects, by using the step S301, fingerprint information of different fingers of the same user or different fingerprint information of different users, and binds the collected information to information such as a user identity and a phone number selected by the user. The information may be stored in a server, thereby completing the business of the user applying for a new card. Then, the process proceeds to step S303.

S303: Fingerprint information sent by a mobile terminal may be received, and the fingerprint information may be verified.

When the user uses the terminal to perform fingerprint collection and requests for obtaining information such as a phone number through the network, the operator server receives, through the network, the fingerprint information sent by the mobile terminal, and compares the received fingerprint information with the user fingerprint information to be bound to the phone number in the step S302 for verification. Then, the process proceeds to step S304 or step S305.

S304: If a verification result of the fingerprint information is that the verification fingerprint information sent by the mobile terminal matches with the fingerprint information bound to the fingerprint phone number, the fingerprint phone number may be bound to the mobile terminal, and the fingerprint phone number may be sent through the network.

According to a comparison verification result of the step S303, if the verification result is that the received fingerprint information sent by the mobile terminal matches with the fingerprint information bound to the fingerprint phone number in the step S302, the operator server binds the fingerprint phone number to the terminal sending the same fingerprint information, for example, binds the fingerprint phone number to a terminal device number, and sends, through the network, related information of the phone number bound to the fingerprint information to the terminal sending the same fingerprint information.

S305: If a verification result of the fingerprint information is that the verification fingerprint information sent by the mobile terminal does not match with the fingerprint information bound to the fingerprint phone number, a verification failure message may be sent.

According to a comparison verification result of the step S303, if the verification result of the fingerprint information is that the verification fingerprint information sent by the mobile terminal does not match with the fingerprint information bound to the fingerprint phone number in the step S302, the operator server sends, through the network, a verification failure message to the terminal sending the same fingerprint information, for example, sends "Fingerprint information does not exist", "Verification fails, please collect fingerprint information again", and the like.

Figure 4:
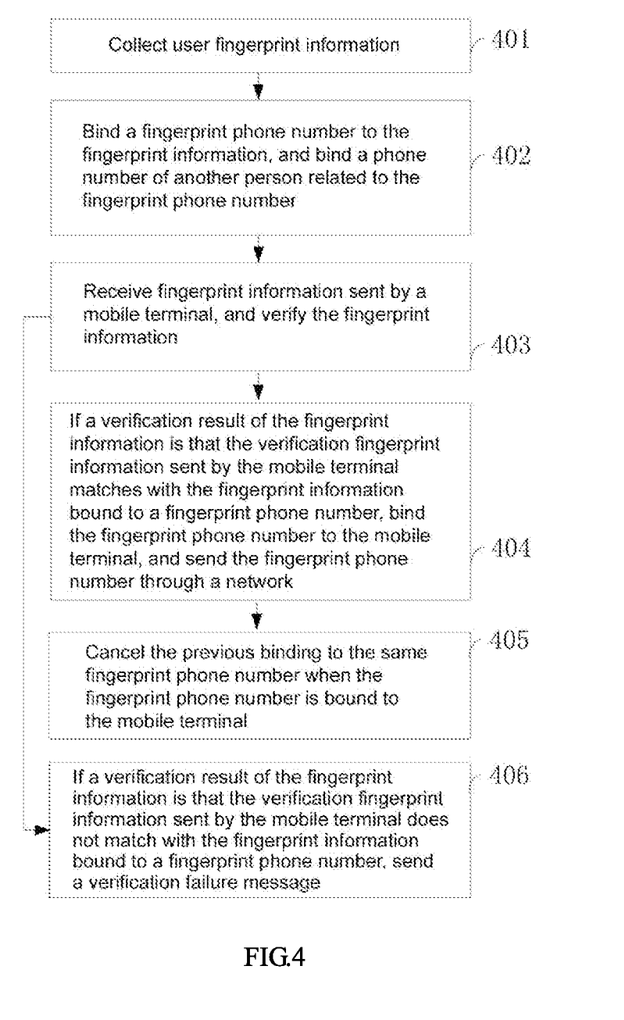
FIG. 4 depicts a schematic flow chart of another embodiment of a fingerprint based communication method according to the present disclosure.

Referring to FIG. 4, FIG. 4 depicts a schematic flow chart of a fourth implementation manner of a fingerprint based communication method according to the present invention, and the method may include:

S401: User fingerprint information may be collected.

The step S401 may be similar to the step S301 in previous embodiments, and may be not repeated herein.

S402: The fingerprint phone number may be bound to the fingerprint information, and may be bound to a phone number of another person related to the fingerprint phone number.

The operator collects, by using the step S301, fingerprint information of different fingers of the same user or different fingerprint information of different users, and binds the collected information to information such as a user identity and a phone number selected by the user. The information may be stored in a server, thereby completing the business of the user applying for a new card. The phone number of another person related to the user may be bound simultaneously or not simultaneously, and the user can transmit an address list by the operator, so as to be bound to the subscribed phone number, or the user may input a user address list by using the terminal so as to be bound to the fingerprint phone number, or the user may not bind to the phone number of another person, but obtain the phone number of another person by logging in to another tool on the Internet, for example, obtain the phone number of another person by entering "xx address list" through the network. Then, the process proceeds to step S303.

S403: Fingerprint information sent by a mobile terminal may be received, and the fingerprint information may be verified.

S404: If a verification result of the fingerprint information is that the verification fingerprint information matches with the fingerprint information, the fingerprint phone number is bound to the mobile terminal, and the fingerprint phone number may be sent through the network.

The steps S403 and S404 are similar to the steps S303 and S304 in the previous embodiment, and are not repeated herein. If the fingerprint phone number is not acquired for the first time, the process proceeds to step S405.

S405: The previous binding to the same fingerprint phone number may be canceled when the fingerprint phone number is bound to the mobile terminal.

According to the step S404, if the user may be not obtaining the same fingerprint phone number for the first time, to avoid that multiple mobile phones save the same number to cause communication chaos, the operator server actively or non-actively clear the previous binding of the user terminal to the phone number, thereby ensuring that one mobile phone number conducts activities such as communication on one mobile phone at one time.

S406: If a verification result of the fingerprint information is that the verification fingerprint information does not match with the fingerprint information, a verification failure message may be sent.

According to a comparison verification result of the step S403, if the verification result may be that the received fingerprint information does not match with the stored fingerprint information the operator server sends, through the network, a verification failure message to the terminal sending the same fingerprint information, for example, sends "Fingerprint information does not exist, please determine whether to continue or not", "Please collect fingerprint information again", and the like.

Figure 5:
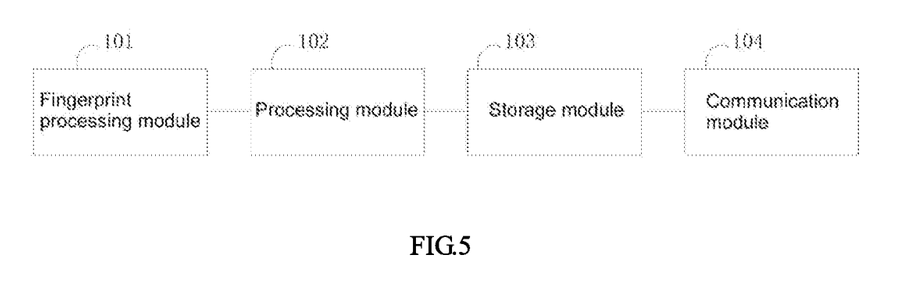
FIG. 5 depicts a schematic structural diagram of another embodiment of a fingerprint based communication terminal according to the present disclosure.

Referring to FIG. 5, FIG. 5 depicts a schematic structural diagram of an embodiment of a fingerprint based communication terminal according to the present disclosure, and the terminal may include: a fingerprint processing module 101, a processing module 102, a storage module 103 and a communication module 104 that are connected sequentially.

The fingerprint processing module 101 may be configured to obtain fingerprint may be configured information.

The processing module 102 may be configured to perform verification through a network according to the fingerprint information obtained by the fingerprint processing module 101, to obtain a fingerprint phone number bound to the fingerprint information.

The storage module 103 to store the fingerprint phone number obtained by the processing module 102.

The communication module 104 may be configured to read the fingerprint phone number in the storage module 103 to conduct communication.

Figure 6:
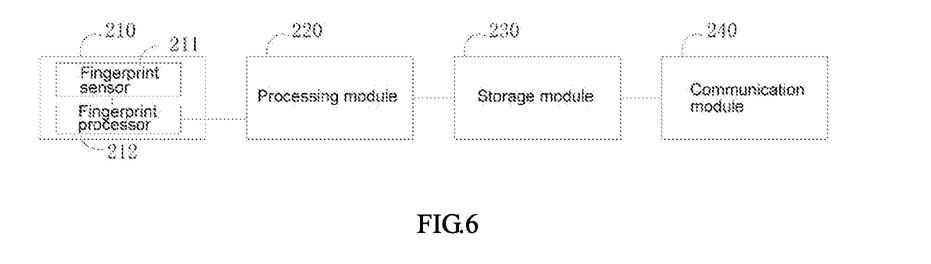
FIG. 6 depicts a schematic structural diagram of another embodiment of a fingerprint based communication terminal according to the present disclosure.

Referring to FIG. 6, FIG. 6 depicts a schematic structural diagram of another embodiment of a fingerprint based communication terminal according to the present disclosure, and the terminal may include: a fingerprint processing module 210, a processing module 220, a storage module 230 and a communication module 240, where the fingerprint processing module 210 may include a fingerprint sensor 211 and a fingerprint processor 212, and the fingerprint sensor 211, the fingerprint processor 212, the processing module 220, the storage module 230 and the communication 240 are connected sequentially.

The fingerprint sensor 211 may be configured to collect a user fingerprint.

The fingerprint processor 212 may be configured to process the user fingerprint collected by the fingerprint sensor 211 to obtain fingerprint information, and transmit the fingerprint information to the processing module 212.

The processing module 220 may be configured to perform verification through a network according to the fingerprint information, to obtain a fingerprint phone number bound to the fingerprint information, and obtain a phone number of another person bound to the fingerprint phone number.

The storage module 230 may be configured to store the fingerprint phone number obtained by the processing module 220.

The communication module 240 may be configured to read one or more fingerprint phone numbers stored in the storage module 230, and communicate by using the fingerprint phone number.

Figure 7:
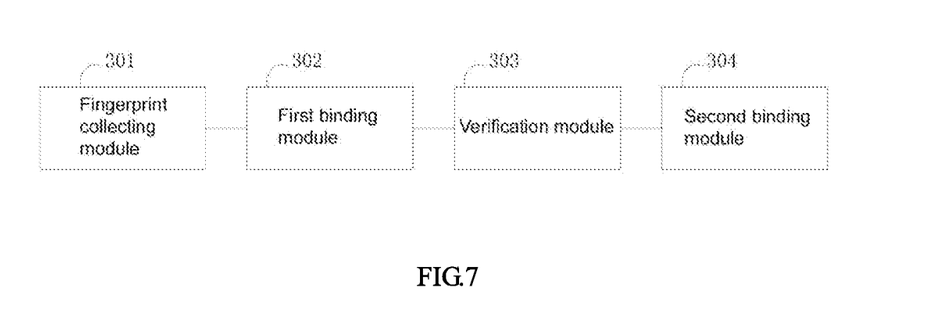
FIG. 7 depicts a schematic structural diagram of an embodiment of a fingerprint based communication server according to the present disclosure.

Referring to FIG. 7, FIG. 7 depicts a schematic structural diagram of an embodiment of a fingerprint based communication server according to the present disclosure, and the server may include: a fingerprint collecting module 301, a first binding module 302, a verification module 303 and a second binding module 304 that are connected sequentially.

The fingerprint collecting module 301 may be configured to collect user fingerprint information when a user subscribes for a new card, and transmit the fingerprint information to the first binding module 302.

The first binding module 302 may be configured to bind the fingerprint information collected by the fingerprint collector 301 to a fingerprint phone number.

The verification module 303 may be configured to receive, through a network, verification fingerprint information of a mobile terminal, compare the verification fingerprint information with the fingerprint information in the first binding module 302, so as to perform verification.

The second binding module 304 may be configured to: when a verification result of the verification module 303 is that the verification fingerprint information matches with the fingerprint information in the first binding module 302, bind the mobile terminal with the fingerprint phone number, and send the fingerprint phone number to the mobile terminal through the network.

Figure 8:
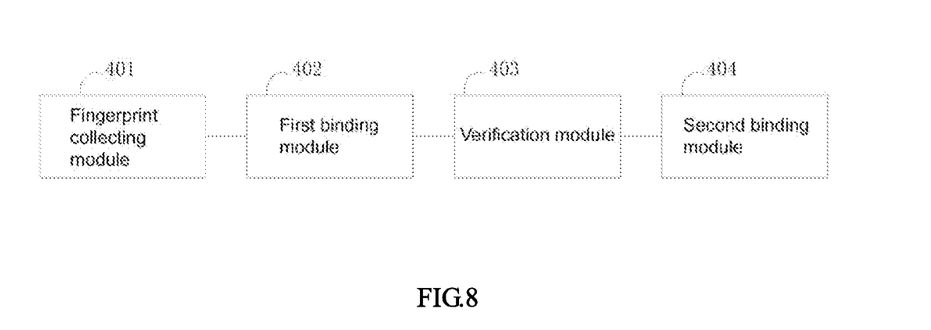
FIG. 8 depicts a schematic structural diagram of another embodiment of a fingerprint based communication server according to the invention present disclosure.

Referring to FIG. 8, FIG. 8 depicts a schematic structural diagram of another embodiment of a fingerprint based communication server according to the present disclosure, and the server may include: a fingerprint collecting module 401, a first binding module 402, a verification module 403 and a second binding module 404 that are connected sequentially.

The fingerprint collecting module 401 may be configured to collect user fingerprint information when a user subscribes for a new card, and transmit the fingerprint information to the first binding module 402.

The first binding module 402 may be configured to bind the fingerprint information collected by the fingerprint collector 401 to the fingerprint information; and the first binding module 402 may be further configured to bind a phone number of another person related to the fingerprint phone number.

The verification module 403 may be configured to receive, through a network, verification fingerprint information of a mobile terminal, compare the verification fingerprint information with the fingerprint information in the first binding module 402, so as to perform verification.

The second binding module 404 may be configured to: when a verification result of the verification module 403 may be that the verification fingerprint information matches with the fingerprint information in the first binding module 402, bind the mobile terminal to the fingerprint phone number, and send the fingerprint phone number to the mobile terminal through the network; and the second binding module 404 may be further configured to cancel the previous binding to the same fingerprint phone number when the fingerprint phone number may be bound to the mobile terminal.

The above descriptions are embodiments of the present disclosure, and are not intended to limit the scope of the present disclosure. Any equivalent structure or equivalent flow variation made by using the description and accompanying drawings of the present disclosure and applied directly or indirectly in other related technical fields shall all fall within the protection scope of the present disclosure.

The invention claimed is:

1. A fingerprint based communication terminal, wherein the terminal comprises:
   a fingerprint processing module
   configured to obtain first fingerprint information, the fingerprint processing module comprising:
      a fingerprint sensor configured to collect a first fingerprint of a user and a second fingerprint of the user different than the first fingerprint, and
      a fingerprint processor configured to process the first fingerprint to obtain first fingerprint information and to process the second fingerprint to obtain second fingerprint information;
   a processing module configured to:
      receive the first fingerprint information and the second finger print information from the fingerprint processor,
      obtain, through a network according to the first fingerprint information, a fingerprint phone number bound to the first fingerprint information, and obtain a second phone number bound to the second fingerprint information and to the fingerprint phone number;

a storage module configured to store the fingerprint phone number and the second phone number; and a communication module configured to read the fingerprint phone number and the second phone number from the storage module to conduct a communication.

2. A fingerprint based communication server, wherein the server comprises:

a fingerprint collector configured to collect fingerprint information of a user;

a first binding module configured to:
bind the fingerprint information to a fingerprint phone number, and
bind a second phone number to the fingerprint phone number;

a verification module configured to receive, through a network, verification fingerprint information received from a mobile terminal and compare the verification fingerprint information with the fingerprint information received from the first binding module, so as to perform verification; and a second binding module configured to:
bind the mobile terminal with the fingerprint phone number if a verification result of the verification module is that the verification fingerprint information matches with the fingerprint information in the first binding module,
send the bound fingerprint phone number to the mobile terminal, and
cancel a previous binding of the fingerprint phone number if the fingerprint phone number is already bound to the mobile terminal.

3. A fingerprint based communication method, comprising:

collecting, via a fingerprint collector of a server device, fingerprint information of a user;

binding, via a first binding module of the server device, a fingerprint phone number to the fingerprint information;

binding, via the first binding module of the server device, a second phone number to the fingerprint phone number;

receiving, via a verification module of the server device, verification fingerprint information sent from a mobile terminal associated with the user;

verifying, via the verification module of the server device, the verification fingerprint information with the fingerprint information of the user; and binding, via a second binding module of the server device, the fingerprint phone number to the mobile terminal if a verification result of the fingerprint information is that the verification fingerprint information sent by the mobile terminal matches with the fingerprint information of the user;

sending, via the second binding module of the server device, the bound fingerprint phone number to the mobile terminal; and canceling, via the second binding module of the server device, a previous binding of the fingerprint phone number if the fingerprint phone number is already bound to the mobile terminal.

4. The terminal according to claim 1, wherein the fingerprint processor is configured to further determine a completeness degree of the user fingerprint collected by the fingerprint sensor.

5. The terminal according to claim 4, wherein the fingerprint processor is configured to further instruct the fingerprint sensor to collect a second user fingerprint when it is determined that the completeness degree of the collected user fingerprint is not satisfactory.

6. The server according to claim 2, wherein the verification fingerprint information sent by the mobile terminal is based on a complete user fingerprint.

7. The method according to claim 3, wherein the verification fingerprint information sent by the mobile terminal is based on a complete user fingerprint.

8. The method according to claim 3, wherein multiple phone numbers are bound to the mobile terminal.

* * * * *